(12) United States Patent
Monzaki et al.

(10) Patent No.: US 6,317,677 B1
(45) Date of Patent: Nov. 13, 2001

(54) DEVICE FOR CONTROLLING VEHICLE TURN BEHAVIOR BY ENGINE TORQUE CONTROL WITH FEEDBACK OF VEHICLE SPEED

(75) Inventors: Shirou Monzaki, Mishima; Ryochi Watanabe, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/621,649

(22) Filed: Jul. 24, 2000

(30) Foreign Application Priority Data

Aug. 31, 1999 (JP) .................................... 11-244992

(51) Int. Cl.⁷ .............................. G06F 17/00; G06F 7/00
(52) U.S. Cl. ................................ 701/84; 701/41; 701/71; 701/72; 180/421
(58) Field of Search ........................ 701/41, 42, 70, 701/71, 72, 84; 180/421, 422

(56) References Cited

U.S. PATENT DOCUMENTS

| 4,666,013 | * | 5/1987 | Shibahata et al. | 180/421 |
| 4,773,012 | * | 9/1988 | Ito et al. | 701/42 |
| 5,627,756 | * | 5/1997 | Fukada et al. | 701/70 |
| 6,052,641 | * | 4/2000 | Wuerth et al. | 701/70 |
| 6,208,921 | * | 3/2001 | Tsunehara et al. | 701/41 |

FOREIGN PATENT DOCUMENTS

| A-9-125999 | 5/1997 | (JP) . |
| A-10-86705 | 4/1998 | (JP) . |

* cited by examiner

Primary Examiner—William A. Cuchlinski, Jr.
Assistant Examiner—Gertrude Arthur
(74) Attorney, Agent, or Firm—Oliff & Berridge, PLC

(57) ABSTRACT

A device for controlling a turning behavior of a vehicle detects running speed of the vehicle, calculate a standard performance of the turning behavior of the vehicle substantially according to a steering angle input by a steering system and the running speed of the vehicle, calculates a deviation of the turning behavior from the standard performance in an amount of decrease of vehicle running speed to be effected with the vehicle for compensating the deviation, calculates a target decrease of engine torque for effecting the vehicle running speed decrease, and decreases the engine torque according to the target engine torque decrease.

12 Claims, 7 Drawing Sheets

DEVICE FOR CONTROLLING VEHICLE TURN BEHAVIOR BY ENGINE TORQUE CONTROL WITH FEEDBACK OF VEHICLE SPEED

BACKGROUND OF THE INVENTION

1. Field of the Invention

The present invention relates generally to a device for controlling a running behavior of a vehicle such as an automobile, and more particularly, to a device for controlling a turning behavior of a vehicle having an engine, wheels and a steering system by interrelating the engine with the steering system.

2. Description of the Prior Art

It is already known to control the engine of an automobile in controlling a turning behavior thereof, so as to throttle the engine when the turning behavior reaches a predetermined threshold condition, as described in, for example, Japanese Patent Laid-open Publication 9-125999. By so incorporating an engine throttle control in a turning behavior control of an automobile that the automobile is decelerated when the turning behavior reaches a predetermined threshold condition, the turning behavior will be recovered from a threshold condition, so as to be retained from entering into an excessive understeering leading to a driftout or an excessive oversteering leading to a spin.

SUMMARY OF THE INVENTION

However, the inventors note that a threshold condition such as a limit of an excessive understeering or oversteering is against a result already produced by an inappropriate correlation of a vehicle speed due to an engine output and a steering of a vehicle which would have been avoided if the engine output is appropriately controlled in relation to the steering, so that the vehicle is controlled not to approach such an understeering or oversteering limit.

In view of the above, it is a primary object of the present invention to provide a device for controlling a turning behavior of a vehicle such as an automobile, by which the engine output is controlled in relation to the steering operation by a driver, so that the vehicle is protected in an earlier stage from subjecting to an excessive understeering or oversteering which would lead to a driftout or a spin of the vehicle, respectively.

According to the present invention, the above-mentioned primary object is accomplished by a device for controlling a turning behavior of a vehicle having an engine, wheels and a steering system, comprising:

means for detecting operation parameters of the vehicle, including means for detecting running speed of the vehicle;

means for calculating a standard performance of the turning behavior of the vehicle substantially according to a steering angle input by the steering system and a running speed of the vehicle detected by the running speed detection means;

means for calculating a deviation of the turning behavior from the standard performance thereof in an amount of decrease of vehicle running speed to be effected with the vehicle for compensating the deviation;

means for calculating a target decrease of torque of the engine for effecting the vehicle running speed decrease; and means for decreasing the torque of the engine according to the target engine torque decrease.

By such a construction that the turning behavior according to a steering angle input by the steering system and a running speed of the vehicle, i.e. a yaw rate of the vehicle, is calculated with respect to its deviation from a standard performance thereof, so as to obtain the deviation in an amount of decrease of vehicle running speed to be effected with the vehicle for compensating the deviation, and the engine torque is controlled to decrease the vehicle speed for the compensating decrease amount, the turning behavior of the vehicle is controlled as watched in a stage of the vehicle speed in relation to the input of steering, prior to the conventional watching of the turning behavior in the stage of the result of the turn effected by a product of the vehicle speed and the yaw rate.

As an embodiment, the operation parameter detection means may further include means for detecting lateral acceleration of the vehicle, the standard turning behavior performance calculation means may calculate a standard yaw rate of the vehicle, the turning behavior deviation calculation means may calculate the turning behavior deviation by first dividing the lateral acceleration detected by the lateral acceleration detection means with the standard yaw rate to obtain a target vehicle speed, and subtracting the vehicle speed detected by the vehicle speed detection means from the target vehicle speed, so as to obtain a vehicle speed modification amount on a condition that the balance is negative, the vehicle speed modification amount being the vehicle speed decrease to be effected with the vehicle for compensating the deviation into an understeering.

As a further embodiment, the operation parameter detection means may further include means for detecting yaw rate and lateral acceleration of the vehicle, the standard turning behavior performance calculation means may calculate a standard yaw rate of the vehicle and a first provisional target vehicle speed by dividing the lateral acceleration detected by the lateral acceleration detection means with the standard yaw rate on one hand, while calculating on the other hand a second provisional target vehicle speed by dividing the lateral acceleration detected by the lateral acceleration detection means with the yaw rate detected by the yaw rate detection means, and the turning behavior deviation calculation means may subtract the vehicle speed detected by the vehicle speed detection means from either the first or the second provisional target vehicle speed whichever is smaller than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

As a further embodiment, the operation parameter detection means may further include means for detecting yaw rate, the standard turning behavior performance calculation means may calculate a standard yaw rate of the vehicle and a first provisional target vehicle speed by dividing a product of the vehicle speed detected by the vehicle speed detection means and the standard yaw rate with the yaw rate detected by the yaw rate detection means on one hand, while calculating on the other hand a second provisional target vehicle speed by dividing a product of the vehicle speed detected by the vehicle speed detection means and the yaw rate detected by the yaw rate detection means with the standard yaw rate, and the turning behavior deviation calculation means may subtract the vehicle speed detected by the vehicle speed detection means from either the first or the second provisional target vehicle speed whichever is larger than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

As a further embodiment, the vehicle operation parameter detection means may further include means for detecting lateral acceleration of the vehicle or means for detecting friction coefficient of a road surface, and the device may further comprise means for calculating a target deceleration of the vehicle based upon the vehicle running speed decrease amount calculated by the turning behavior deviation calculation means, means for estimating a maximum deceleration of the vehicle allowable by an engine braking based upon the lateral acceleration of the vehicle detected by the lateral acceleration detection means or the road surface friction coefficient detected by the road surface friction coefficient detection means, and means for braking at least one of the wheels until the target deceleration lowers below the maximum allowable deceleration when the target deceleration is higher than the maximum allowable deceleration.

BRIEF DESCRIPTION OF THE DRAWINGS

In the accompanying drawings.

DESCRIPTION OF THE EMBODIMENTS

In the following, the present invention will be described in more detail with respect to some preferred embodiments by referring to the accompanying drawings.

Figure 1A:
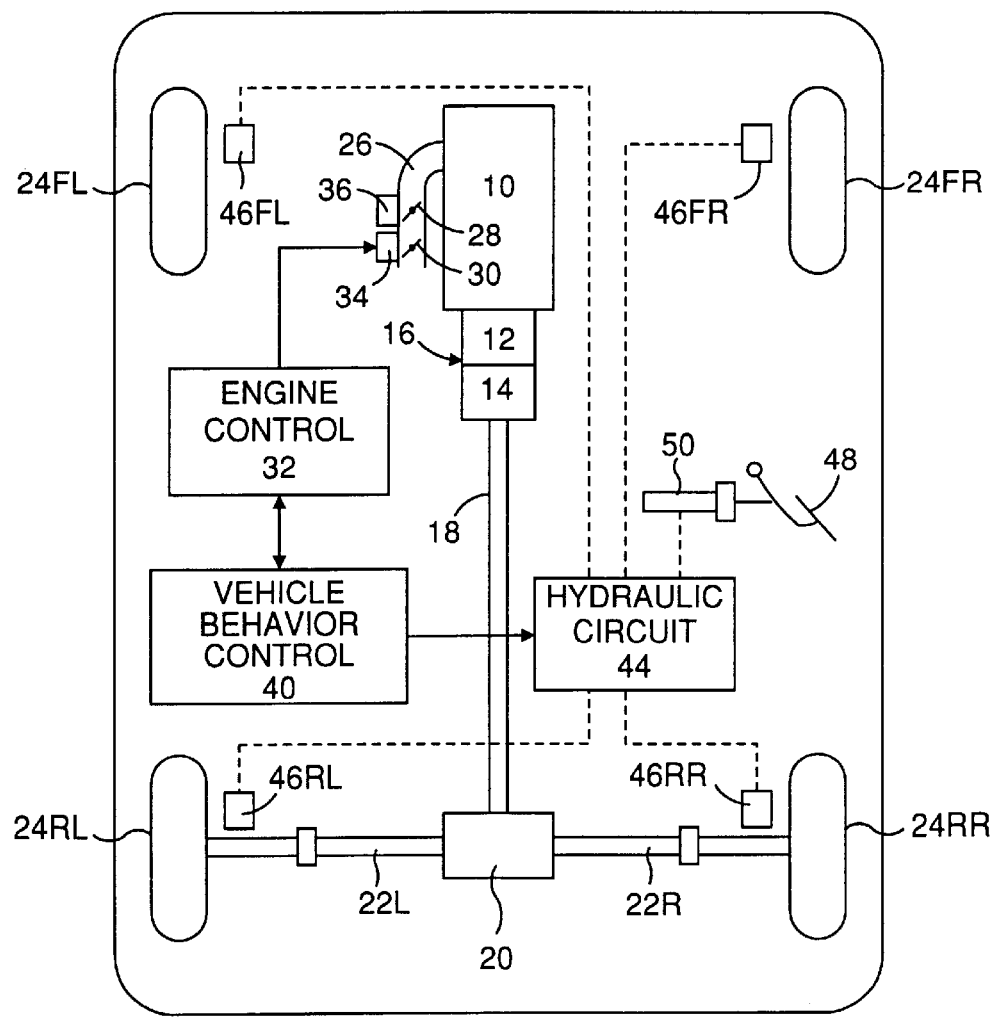
FIG. 1A is a diagrammatical view of a vehicle such as an automobile in which a vehicle behavior control device including the vehicle turn behavior control device according to the present invention is incorporated.

Referring first to FIG. 1A, a vehicle such as an automobile diagrammatically shown therein has an engine 10 which outputs a rotational power through a torque converter 12 and a speed change gear mechanism 14, both constructing a transmission 16 in combination, a propeller shaft 18, a differential gear 20 and left and right axles 22L and 22R toward rear left and rear right wheels 24RL and 24RR. In the figure, 24FL and 24FR are front left and front right wheels adapted to be steered by a steering system which is not shown in the figure but may be of a conventional type. The engine 20 is supplied with a fuel-air mixture through an intake passage 26 equipped with a main throttle valve 28 and a sub-throttle valve 30. The main throttle valve 28 is operated by a driver according to a depression of an accelerator pedal not shown in the figure, while the sub-throttle valve 30 is automatically operated by engine control means 32 through an actuator 34. 36 is a throttle position sensor for detecting the opening position of the main throttle valve 28.

The engine control means 32 are the essential portion of the present invention, constructed to control the engine output in relation to the turning behavior of the vehicle, in association with vehicle behavior control means 40, both of which may indeed be constructed by a common microcomputer. The vehicle behavior control means 40 operate hydraulic circuit means 44 diagrammatically shown to hydraulically operate wheel cylinders 46FL, 46FR, 46RL and 46RR for the front left, front right, rear left and rear right wheels 24FL, 24FR, 24RL and 24RR for braking the corresponding wheels. The hydraulic circuit means 44 are also operated by a depression of a brake pedal 48 by the driver through a master cylinder 50.

Figure 1B:
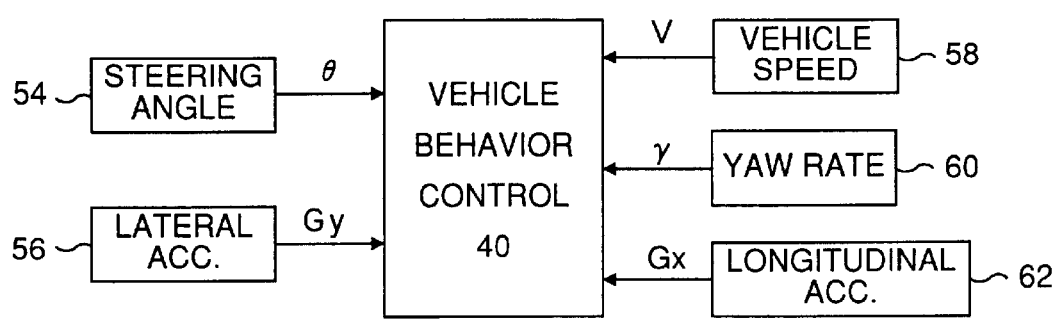
FIG. 1B is a diagram showing supplies of vehicle operation parameters to the vehicle behavior control device.

As diagrammatically shown in FIG. 1B, the vehicle behavior control means 40 are supplied with operation parameters of the vehicle such as steering angle $\theta$ from a steering angle sensor 54, lateral acceleration Gy of the vehicle from a lateral acceleration sensor 56, vehicle speed V from a vehicle speed sensor 58, yaw rate $\gamma$ from a yaw rate sensor 60 and longitudinal acceleration Gx from a longitudinal acceleration sensor 62.

Further details of the engine control means 32 will be described hereinbelow with reference to the operations thereof.

Figure 2:
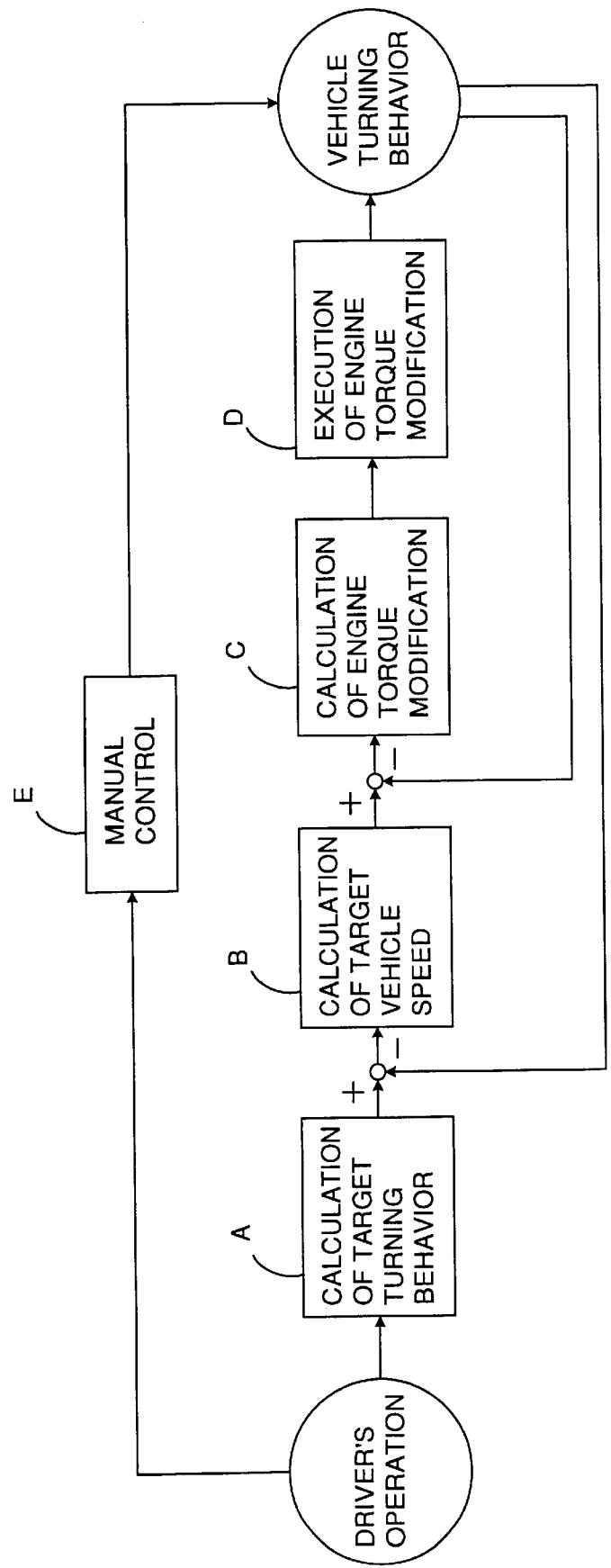
FIG. 2 is a diagram showing a general construction of the vehicle turn behavior control device according to the present invention.

The overall operation of the vehicle turning behavior control device according to the present invention is shown in FIG. 2 in a block diagram. As shown in the block diagram, the turning behavior control device according to the present invention is functionally constructed by block A for conducting calculation of target turning behavior, block B for conducting calculation of target vehicle speed, block C for conducting calculation of engine torque modification and block D for conducting execution of engine torque modification, so as to modify the turning behavior of a vehicle primarily placed under a driver's operation through a manual control system shown by block E.

The calculation blocks A, B and C are indeed constructed by the microcomputer constructing the engine control means 32 and the vehicle behavior control means 40, while the execution block D is constructed by an output part of the microcomputer and the combination of the actuator 34 and the sub-throttle valve 30. As will be noted, the block A calculates a target turning behavior according to the driver's operation, and instructs the block B to calculate a target vehicle speed, while reflecting thereon the vehicle turning behavior as a feedback signal. The block B instructs the block C to calculate an engine torque modification according to the target vehicle speed calculated in block B, while reflecting thereon the vehicle turning behavior as a feedback signal. Then, the block C instructs the block D to execute an engine torque modification according to the calculation thereof in the block C, so as to control the vehicle turning behavior from the phase of the engine torque to meet with the driver's operation for a turn running by suppressing an understeering or an oversteering of the vehicle which would occur if the vehicle is left only under the manual control.

Such a series of calculations and execution of the behavior control by the microcomputer are carried out in parallel with the manual control by the driver, with the results of the manual and computer controls being fed back for the calculations of the target vehicle speed and the engine torque modification. Therefore, it will be appreciated that the vehicle turning behavior is of course placed primarily under the control of the driver through the block E, while the vehicle turning behavior is improved by the automatically operating functions of the blocks A, B, C and D with a feedback of the vehicle turning behavior in the stage of calculation of the target vehicle speed in the block B and a further feedback of the vehicle turning behavior in the stage of calculation of the engine torque modification in the block C.

Figure 3:
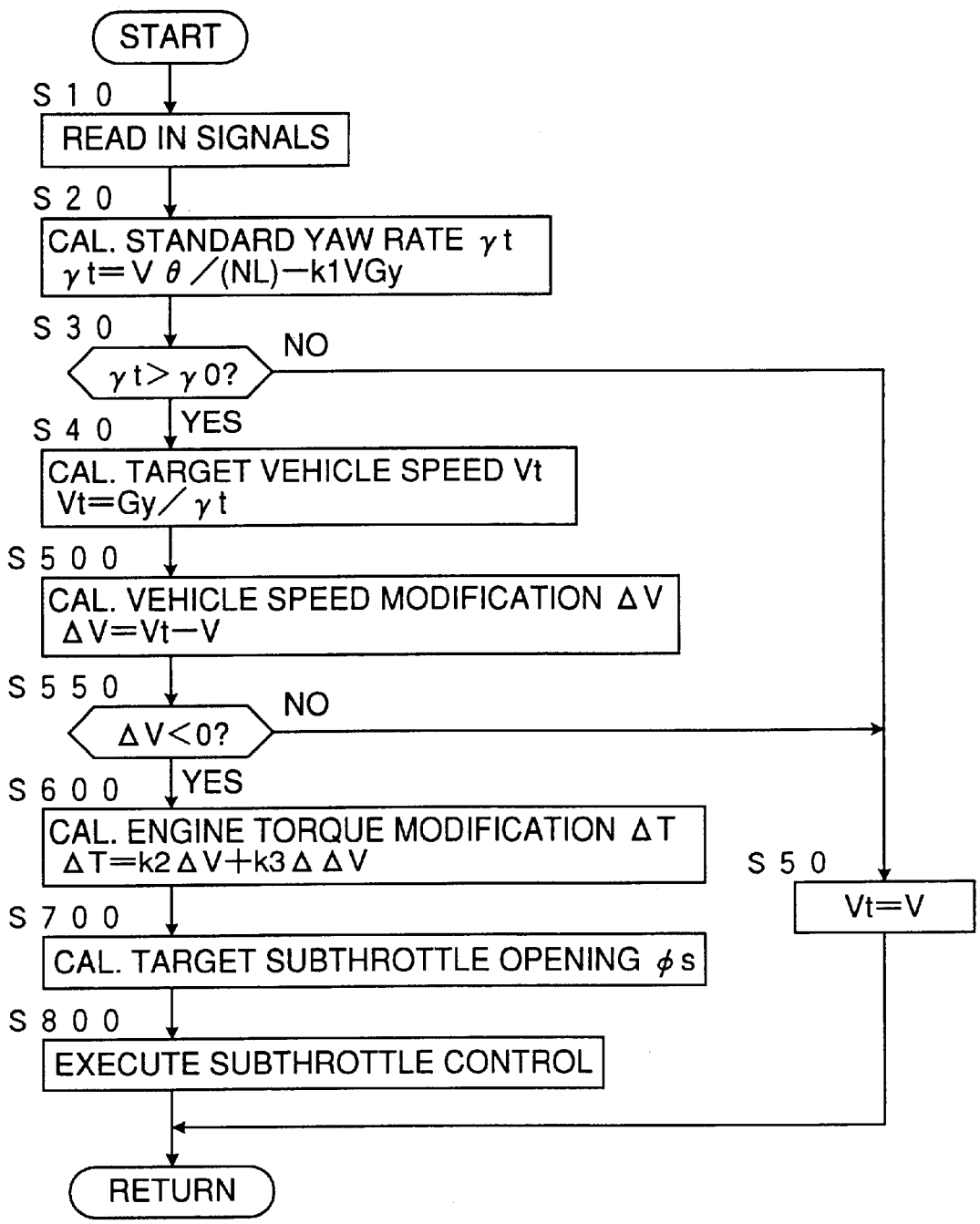
FIG. 3 is a flowchart showing a first embodiment of the present invention in the form of its operation.

FIG. 3 shows a first embodiment, in the form of its operation, of the vehicle turning behavior control device according to the present invention having such a general construction as shown in FIG. 2.

In FIG. 3, when the device is started for operation as by a closure of the ignition switch not shown in the figure, in step 10 signals with regard to operation parameters of the vehicle such as shown in FIG. 1B are read in.

In step 20, a standard yaw rate $\gamma t$ is calculated substantially according to a steering angle $\theta$ detected by the steering angle sensor 54 and a vehicle speed V detected by the vehicle speed sensor 58 as follows:

$$\gamma t = V\theta/(NL) - k1 V Gy$$

wherein N is a gear ratio of the steering system not shown in FIG. 1, L is the so-called wheel base of the vehicle, Gy is a lateral acceleration detected by the lateral acceleration sensor 56, and k1 is an appropriate coefficient. Since the influence of the lateral acceleration Gy on the standard yaw rate is minor, the coefficient k1 is a low value, so that the standard yaw rate $\gamma t$ is determined substantially according to the steering angle $\theta$ and the vehicle speed V.

In step 30, it is judged if the standard yaw rate $\gamma t$ calculated above is larger than a small threshold value $\gamma 0$. When the answer of step 30 is yes, the control proceeds to step 40.

In step 40, a target vehicle speed Vt is calculated according to the lateral acceleration Gy and the standard yaw rate $\gamma t$ as follows:

$$Vt = Gy/\gamma t$$

The standard yaw rate $\gamma t$ is a result of a target turning behavior calculation such as conducted by the block A of FIG. 1 based upon the steering angle $\theta$ input as a driver's operation, while the lateral acceleration Gy is a vehicle turning behavior. Generally in this art, parameters such as $\theta$, $\gamma$ and Gy having a discrimination of left or right orientation are signed positive when they are concerned with one side turn of the vehicle such as, for example, left tern, while they are signed negative when they are concerned with the other side turn of the vehicle such as, for example, right turn. According to such a rule, the sign of Vt is always positive, and an increase of the absolute value of $\gamma t$ decreases the positive value of Vt, while an increase of the absolute value of Gy increases the positive value of Vt. As will be noted hereinbelow, a decrease of Vt is processed to increase the engine torque modification (i.e. the control amount), while an increase of Vt decreases the control amount. Therefore, the calculation of Vt=Gy/$\gamma t$ incorporates therein a negative feedback of the vehicle turning behavior (Gy) to the input ($\gamma t$) from block A to block B as shown diagrammatically by a plus/minus addition point in FIG. 2.

When the answer of step 30 is no, the control proceeds to step 50, wherein the target vehicle speed Vt is set to the actual vehicle speed V, and then the control re turns to step 10.

In step 500, a vehicle speed modification $\Delta V$ is calculated as a difference of the target vehicle speed Vt from the actual vehicle speed V as follows:

$$\Delta V = Vt - V$$

The calculation of Vt–V corresponds to the negative feedback of the vehicle turn behavior (V) to the input (Vt) from block B to block C as shown by another plus/minus addition point in FIG. 2.

In step 550, it is judged if the difference $\Delta V$ is smaller than 0, i.e. negative, When the vehicle is understeering in a turn running, the lateral acceleration Gy due to the understeered yaw rate is smaller than the lateral acceleration due to be generated by the standard yaw rate $\gamma t$. Therefore, the target vehicle $\Delta V$ calculated in step 500 is smaller the actual vehicle speed V. Therefore, when the answer of step 550 is yes, it indicates that the vehicle is in an understeered condition at a magnitude corresponding to the vehicle speed difference $\Delta V$ (negative).

Then, in step 600, an engine torque modification $\Delta T$ is calculated according to $\Delta V$ and its change rate $\Delta\Delta V$ as follows:

$$\Delta T = k2\Delta V + k3\Delta\Delta V$$

wherein k2 and k3 are appropriate coefficients, both being positive, so that $\Delta T$ is obtained in a negative value.

In step 700, a target sub-throttle opening $\phi s$ for decreasing the engine torque by an amount of $|\Delta T|$ is calculated, Then in step 800, a corresponding sub-throttle control is executed, so that the sub-throttle valve 30 is moved toward a more throttling position by the actuator 34, and to accomplish the reduction $|\Delta T|$ of the engine torque.

Figure 4:
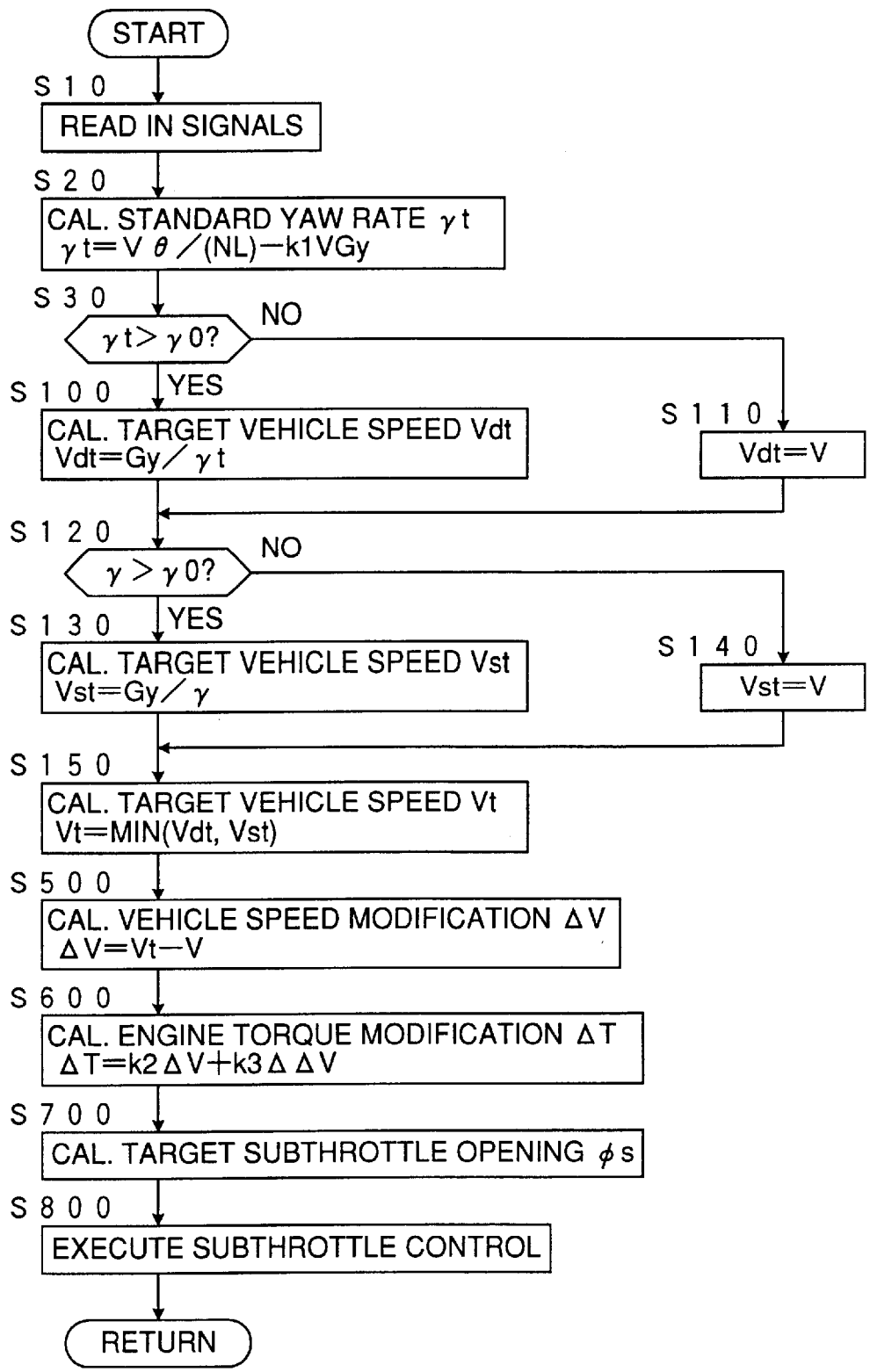
FIG. 4 is a flowchart showing a second embodiment of the present invention in the form of its operation.

FIG. 4 is a flowchart similar to FIG. 3, showing a second embodiment of the vehicle turning behavior control device according to the present invention. In FIG. 4, the steps corresponding to those shown in FIG. 3 are designated by the same step numbers and operate in the same manner as in FIG. 3.

In this embodiment, when the answer of step 30 is yes, then in step 100 a target vehicle speed Vdt is calculated in the same manner as in step 40 of FIG. 3, denoting the ratio Gy/$\gamma t$ as Vdt, indicating that this is a standard vehicle speed if the vehicle is understeering in the turn running. When the answer of step 30 is no, the control bypasses step 100 through step 110, where Vdt is set to the actual vehicle speed V.

In step 120, it is judged if the yaw rate $\gamma$ detected by the yaw rate sensor 60 is larger than the small threshold value $\gamma 0$. When the answer is yes, the control proceeds to step 130.

In step 130, another target vehicle speed Vst is calculated according to the lateral acceleration Gy and the yaw rate as $\gamma$ follows:

$$Vst = Gy/\gamma$$

When the answer of step 120 is no, the control bypasses step 130 through step 140, where Vst is set to the actual vehicle speed V.

In step 150, a smaller one of Vdt calculated in step 100 and Vdt calculated in step 130 is selected as a target vehicle speed Vt. It is generally considered that when the vehicle is understeering in a turn running, the vehicle is not oversteering in the same turn running, while when the vehicle is oversteering in a turn running, the vehicle is not understeering in the same turn running. Therefore, when Vdt is smaller than Vst, it may be assumed that Gy is smaller than a due lateral acceleration corresponding to the standard yaw rate γ1, that is, the vehicle is understeering, while when Vst is smaller than Vdt, it may be assumed that γ is larger than the standard yaw rate γ1, that is the vehicle is oversteering.

In either case, the control proceeds to step 500, and a vehicle speed modification ΔV is calculated as a difference of Vt from V detected by the vehicle speed sensor 58. When a substantial understeering or a substantial oversteering occurs in a turn running, Vdt in the understeering or Vst in the oversteering is smaller than V, so that ΔV is calculated as a substantial negative value.

Then, in step 600, an engine torque modification ΔT is calculated in the same manner as in step 600 of the embodiment of FIG. 3. Then, based upon ΔT thus obtained, in step 700, the target throttle opening φs is calculated in the same manner as in step 700 of the embodiment of FIG. 3, and then in step 800, the sub-throttle control is executed in the same manner as in step 800 of the embodiment of FIG. 3.

Figure 5:
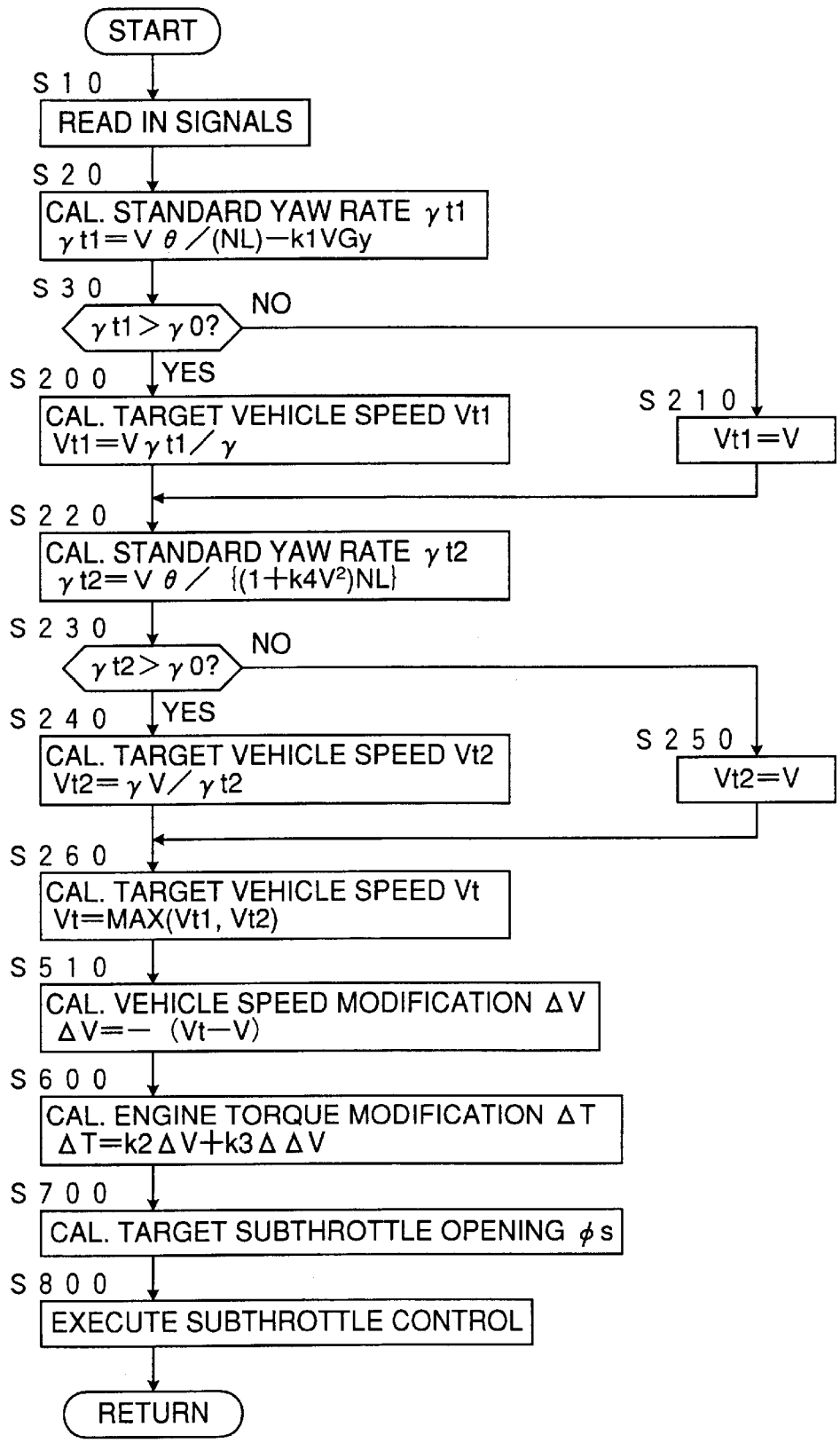
FIG. 5 is a flowchart showing a third embodiment of the present invention in the form of its operation.

FIG. 5 is a flowchart similar to that of FIG. 3 or 4, showing a third embodiment of the vehicle turning behavior control device according to the present invention. Also in FIG. 5, the steps corresponding to those shown in FIG. 3 or 4 are designated by the same step numbers and operate in the same manner as in the embodiment of FIG. 3 or 4.

In this embodiment, when the answer of step 30 is yes, in step 200, based upon the standard yaw rate calculated in step 20 in the same manner as in step 20 of FIG. 3 or 4 but denoted now as γt 1 and the vehicle speed V and the yaw rate γ detected by the vehicle speed sensor 58 and the yaw rate sensor 60, respectively, a target vehicle speed Vt1 is calculated as follows:

$$Vt1 = V\gamma t1/\gamma$$

When the answer of step 30 is no, the control bypasses step 200 through step 210, where Vt1 is set to the actual vehicle speed V.

Then in step 220, a standard yaw rate γt2 is calculated more strictly based upon only V and θ as follows:

$$\gamma t2 = V\theta/\{(1+k4V^2)NL\}$$

wherein k4 is another appropriate coefficient.

In step 230, it is judged if γt2 is larger than the threshold value γ0. When the answer is yes, the control proceeds to step 240, while when the answer is no, the control bypasses step 240 through step 250, where Vt2 is set to the actual vehicle speed V.

In step 240, another target vehicle speed Vt2 is calculated according to the standard yaw rate γt2, the actual yaw rate γ detected by the yaw rate sensor 60 and the actual vehicle speed V detected by the the vehicle speed sensor 58, as follows:

$$Vt2 = \gamma V/\gamma t2$$

When the vehicle is understeering in the turn running, Vt1 will be calculated to be larger than the actual vehicle speed V, while when the vehicle is oversteering in the turn running, Vt2 will be calculated to be larger than the actual vehicle speed V. Therefore, also assuming that no oversteering occurs at the same time as an understeering in a turn running, while or no understeering occurs at the same time as an oversteering in a turn running, in step 260, a larger one of Vt1 and Vt2 is selected as a target vehicle speed Vt, with an assumption that, when Vt1 is selected, the vehicle is understeering in the turn, while when Vt2 is selected, the vehicle is oversteering in the turn.

In step 510, a vehicle speed modification ΔV is calculated as a difference of Vt from V as follows:

$$\Delta V = -(Vt-V)$$

Since in this case Vt is larger than V when an understeering or an oversteering is occurring, the sign of the difference (Vt−V) is reversed for the vehicle speed modification ΔV in the same sense as in the embodiment of FIG. 3 or 4.

Then, in the subsequent steps 600, 700 and 800, the engine torque is controlled based upon ΔV in the same manner as in the embodiment of FIG. 3 or 4.

Figure 6:
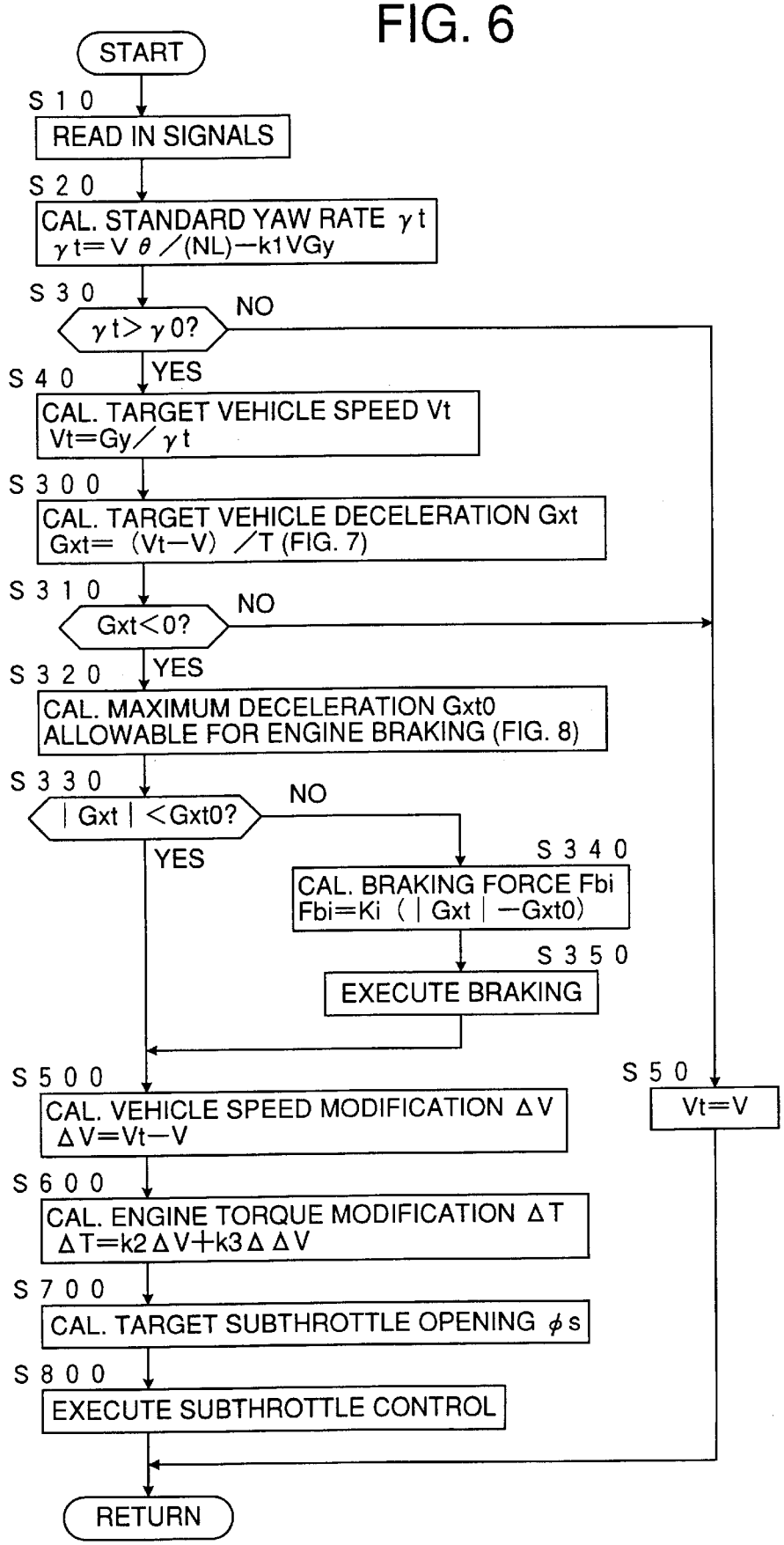
FIG. 6 is a flowchart showing a modification incorporated, as an embodiment, into the vehicle turn behavior control device shown in FIG. 3.

FIG. 6 is a flowchart similar to those of FIGS. 3–5, showing still another embodiment of the present invention. Indeed, this embodiment is a modification of the embodiment of FIG. 3. Therefore, in FIG. 6, the steps corresponding to those of FIG. 3 are designated by the same step numbers as in FIG. 3 and operate in the same manner as those in FIG. 3.

Figure 7:
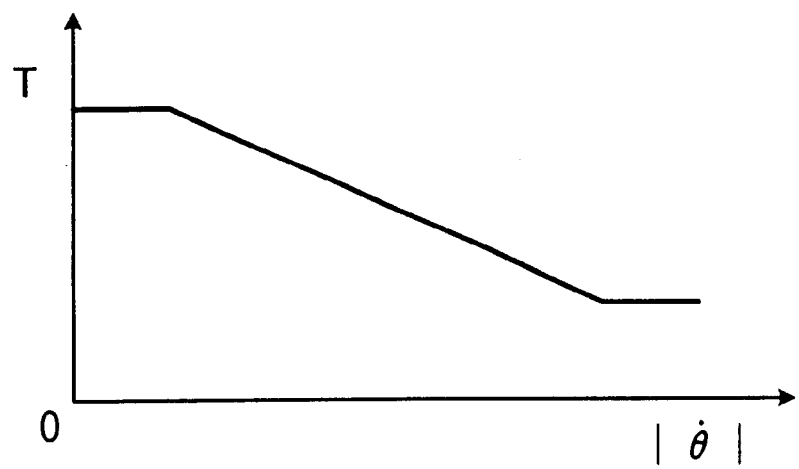
FIG. 7 is a map showing an embodiment of a time T incorporated in the flowchart of FIG. 6.

In this embodiment, subsequent to step 40, in step 300, a target deceleration Gxt of the vehicle is calculated according to the target vehicle speed Vt calculated above, the actual vehicle speed V detected by the vehicle speed sensor 58 and a time T determined as shown in a map of FIG. 7 according to the change rate of the steering angle θ as follows:

$$Gxt = (Vt-V)/T$$

In step 310, it is judged if the value of Gxt calculated above is negative or not. This step corresponds to step 550 of FIG. 3, judging if the vehicle is understeering. When the answer is yes, the control proceeds to step 320, while when the answer is no, the control returns through step 50.

Figure 8:
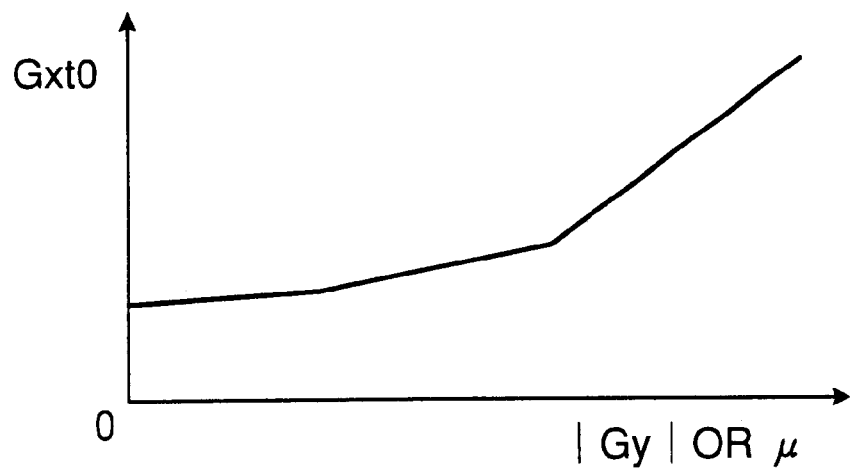
FIG. 8 is a map showing an embodiment of a threshold deceleration Gxto incorporated in the flowchart of FIG. 6.

Then, in step 320, a maximum deceleration Gxt0 allowable for the engine braking is calculated based upon the lateral acceleration Gy detected by the lateral acceleration sensor 56 or a friction coefficient μ of the road surface by looking at a map such as shown in FIG. 8. The friction coefficient μ of the road surface may be obtained based upon the lateral acceleration Gy and a longitudinal acceleration Gx detected by the longitudinal acceleration sensor 62 such as $\mu=(Gx^2+Gy^2)^{1/2}$.

In step 330, it is judged if the absolute value of Gxt is smaller than the value of Gxt0. When the answer is yes, that is, when the deceleration of the vehicle to be effected for attaining the target vehicle steed Vt is small enough for allowing the engine braking with no undue slippage of the wheel tires on the road surface, the control proceeds immediately to step 500.

On the other hand, when the answer of step 330 is no, the control proceeds to step 340, and braking forces Fbi (i=fl, fr, rl and rr) to be applied to all or selected one or ones of the wheels 24FL–24RR are calculated as follows:

$$Fbi = Ki(|Gx|-Gxt0)$$

wherein Ki (i=fl, fr, rl and rr) are appropriate coefficients for the respective wheels.

Then, in step 350, braking by the forces Fbi of the all or selected wheel or wheels are executed, before the control proceeds to step 500.

Thus, according to this modification, it is effectively avoided that the wheel tires cause a slippage over the road surface by a too much engine braking for the turn behavior control.

Although the present invention has been described in detail with respect to some preferred embodiments thereof, it will be apparent for those skilled in the art that various other embodiments and modifications are possible with respect to shown embodiments within the scope of the present invention.

What is claimed is:

1. A device for controlling a turning behavior of a vehicle having an engine, wheels and a steering system, comprising:

means for detecting operation parameters of the vehicle, including means for detecting running speed of the vehicle;

means for calculating a standard performance of the turning behavior of the vehicle substantially according to a steering angle input by the steering system and a running speed of the vehicle detected by the running speed detection means;

means for calculating a deviation of the turning behavior from the standard performance thereof in an amount of decrease of vehicle running speed to be effected with the vehicle for compensating the deviation;

means for calculating a target decrease of torque of the engine for effecting the vehicle running speed decrease; and means for decreasing the torque of the engine according to the target engine torque decrease.

2. A device according to claim 1, wherein the operation parameter detection means further include means for detecting lateral acceleration of the vehicle, the standard turning behavior performance calculation means calculate a standard yaw rate of the vehicle, and the turning behavior deviation calculation means calculate the turning behavior deviation by first dividing the lateral acceleration detected by the lateral acceleration detection means with the standard yaw rate to obtain a target vehicle speed and then subtracting the vehicle speed detected by the vehicle speed detection means from the target vehicle speed, so as to obtain a vehicle speed modification amount on a condition that the balance is negative, the vehicle speed modification amount being the vehicle speed decrease to be effected with the vehicle for compensating the deviation into an understeering.

3. A device according to claim 1, wherein the operation parameter detection means further include means for detecting yaw rate and lateral acceleration of the vehicle, the standard turning behavior performance calculation means calculate a standard yaw rate of the vehicle and a first provisional target vehicle speed by dividing the lateral acceleration detected by the lateral acceleration detection means with the standard yaw rate on one hand, while calculating on the other hand a second provisional target vehicle speed by dividing the lateral acceleration detected by the lateral acceleration detection means with the yaw rate detected by the yaw rate detection means, and the turning behavior deviation calculation means subtract the vehicle speed detected by the vehicle speed detection means from either the first or the second provisional target vehicle speed whichever is smaller than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

4. A device according to claim 1, wherein the operation parameter detection means further include means for detecting yaw rate, the standard turning behavior performance calculation means calculate a standard yaw rate of the vehicle and a first provisional target vehicle speed by dividing a product of the vehicle speed detected by the vehicle speed detection means and the standard yaw rate with the yaw rate detected by the yaw rate detection means on one hand, while calculating on the other hand a second provisional target vehicle speed by dividing a product of the vehicle speed detected by the vehicle speed detection means and the yaw rate detected by the yaw rate detection means with the standard yaw rate, and the turning behavior deviation calculation means subtract the vehicle speed detected by the vehicle speed detection means from either the first or the second provisional target vehicle speed whichever is larger than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

5. A device according to claim 1, wherein the vehicle operation parameter detection means further include means for detecting lateral acceleration of the vehicle, and the device further comprises means for calculating a target deceleration of the vehicle based upon the vehicle running speed decrease amount calculated by the turning behavior deviation calculation means, means for estimating a maximum deceleration of the vehicle allowable by an engine braking based upon the lateral acceleration of the vehicle detected by the lateral acceleration detection means, and means for braking at least one of the wheels until the target deceleration lowers below the maximum allowable deceleration when the target deceleration is higher than the maximum allowable deceleration.

6. A device according to claim 1, wherein the vehicle operation parameter detection means further include means for detecting friction coefficient of a road surface, and the device further comprises means for calculating a target deceleration of the vehicle based upon the vehicle running speed decrease amount calculated by the turning behavior deviation calculation means, means for estimating a maximum deceleration of the vehicle allowable by an engine braking based upon the road surface friction coefficient detected by the road surface friction coefficient detection means, and means for braking at least one of the wheels until the target deceleration lowers below the maximum allowable deceleration when the target deceleration is higher than the maximum allowable deceleration.

7. A method for controlling a turning behavior of a vehicle having an engine, wheels and a steering system, comprising the steps of:

detecting operation parameters of the vehicle, including running speed of the vehicle;

calculating a standard performance of the turning behavior of the vehicle substantially according to a steering angle input by the steering system and the detected running speed of the vehicle;

calculating a deviation of the turning behavior from the standard performance thereof in an amount of decrease of vehicle running speed to be effected with the vehicle for compensating the deviation;

calculating a target decrease of torque of the engine for effecting the vehicle running speed decrease; and decreasing the torque of the engine according to the target engine torque decrease.

8. A method according to claim 7, further comprising the steps of:

detecting lateral acceleration of the vehicle, calculating a standard yaw rate of the vehicle, and calculating the turning behavior deviation by first dividing the lateral acceleration with the standard yaw rate to obtain a target vehicle speed and then subtracting the vehicle speed from the target vehicle speed, so as to obtain a vehicle speed modification amount on a condition that the balance is negative, the vehicle speed modification amount being the vehicle speed decrease to be effected with the vehicle for compensating the deviation into an understeering.

9. A method according to claim 7, further comprising the steps of:

detecting yaw rate and lateral acceleration of the vehicle, calculating a standard yaw rate of the vehicle and a first provisional target vehicle speed by dividing the lateral acceleration with the standard yaw rate on one hand, while calculating on the other hand a second provisional target vehicle speed by dividing the lateral acceleration with the yaw rate, and subtracting the vehicle speed from either the first or the second provisional target vehicle speed whichever is smaller than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

10. A method according to claim 7, further comprising the steps of:

detecting yaw rate, calculating a standard yaw rate of the vehicle and a first provisional target vehicle speed by dividing a product of the vehicle speed and the standard yaw rate with the yaw rate on one hand, while calculating on the other hand a second provisional target vehicle speed by dividing a product of the vehicle speed and the yaw rate with the standard yaw rate, and subtracting the vehicle speed from either the first or the second provisional target vehicle speed whichever is larger than the other, so as to obtain a vehicle speed modification amount on a condition that, when the first provisional target vehicle speed is selected, the vehicle speed modification amount is the vehicle speed decrease to be effected with the vehicle for compensating the deviation into an understeering, while when the second provisional target vehicle speed is selected, the vehicle speed modification amount is the vehicle speed decrease to be effected with the vehicle for compensating the deviation into an oversteering.

11. A method according to claim 7, further comprising the steps of:

detecting lateral acceleration of the vehicle, calculating a target deceleration of the vehicle based upon the vehicle running speed decrease amount, estimating a maximum deceleration of the vehicle allowable by an engine braking based upon the lateral acceleration of the vehicle, and braking at least one of the wheels until the target deceleration lowers below the maximum allowable deceleration when the target deceleration is higher than the maximum allowable deceleration.

12. A method according to claim 7, further comprising the steps of:

detecting friction coefficient of a road surface, calculating a target deceleration of the vehicle based upon the vehicle running speed decrease amount, estimating a maximum deceleration of the vehicle allowable by an engine braking based upon the road surface friction coefficient, and braking at least one of the wheels until the target deceleration lowers below the maximum allowable deceleration when the target deceleration is higher than the maximum allowable deceleration.

* * * * *